(12) United States Patent
Callegari

(10) Patent No.: US 7,076,735 B2
(45) Date of Patent: Jul. 11, 2006

(54) SYSTEM AND METHOD FOR NETWORK TRANSMISSION OF GRAPHICAL DATA THROUGH A DISTRIBUTED APPLICATION

(75) Inventor: Andres C. Callegari, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 10/623,672

(22) Filed: Jul. 21, 2003

(65) Prior Publication Data

US 2005/0021656 A1   Jan. 27, 2005

(51) Int. Cl.
*G06F 3/00* (2006.01)
*G09G 5/00* (2006.01)

(52) U.S. Cl. .................. 715/733; 715/838; 715/744; 715/748; 345/582

(58) Field of Classification Search ........ 345/751–759, 345/733, 740, 744–748, 838, 700, 848–852, 345/419, 428, 582, 619; 715/751–759, 733, 715/740, 744–748, 700, 838, 848–852; 709/201–205
See application file for complete search history.

(56) References Cited

U.S. PATENT DOCUMENTS

| | | | |
|---|---|---|---|
| 4,939,509 A | 7/1990 | Bartholomew et al. | |
| 5,241,625 A | 8/1993 | Epard et al. | |
| 5,543,939 A * | 8/1996 | Harvey et al. | 375/240.02 |
| 5,649,104 A | 7/1997 | Carleton et al. | |
| 5,704,042 A | 12/1997 | Hester et al. | |
| 5,819,038 A | 10/1998 | Carleton et al. | |
| 5,821,925 A * | 10/1998 | Carey et al. | 345/757 |
| 5,835,713 A | 11/1998 | FitzPatrick et al. | |
| 5,923,844 A | 7/1999 | Pommier et al. | |
| 5,933,148 A * | 8/1999 | Oka et al. | 345/427 |
| 5,944,785 A | 8/1999 | Pommier et al. | |
| 5,995,951 A | 11/1999 | Ferguson | |
| 6,047,314 A | 4/2000 | Pommier et al. | |
| 6,061,717 A | 5/2000 | Carleton et al. | |
| 6,160,919 A | 12/2000 | Hale | |
| 6,208,762 B1 * | 3/2001 | Garland et al. | 382/254 |
| 6,209,021 B1 | 3/2001 | Ahimovic et al. | |
| 6,219,057 B1 * | 4/2001 | Carey et al. | 345/419 |

(Continued)

OTHER PUBLICATIONS

Tong Chu, James E. Fowler, Robert J. Moorhead II, "Evaluation and extension of SGI Vizserver," Apr. 2001, pp. 63-73, Proc. SPIE 4368.

(Continued)

*Primary Examiner*—Sy D. Luu
(74) *Attorney, Agent, or Firm*—Crain Caton & James, P.C.

(57) ABSTRACT

Systems and methods for network transmission of three-dimensional graphical data are disclosed. A single graphical application instance can virtually and efficiently exist on multiple local or remote display systems by directly sharing its raw rendered framebuffer memory information among all local or remote graphics accelerators, thus avoiding the need to re-render any application information again on each node. An internal graphics card is used to scale the rendered data prior to transmission. This graphics scaling eliminates the need for data compression or image compression and achieves an adaptive, hardware-accelerated reduction in network bandwidth. Furthermore, since all memory and remote processing support tasks are performed within the graphics card, the CPU, system bus, and memory bandwidth remain available to the system and other applications.

60 Claims, 7 Drawing Sheets

U.S. PATENT DOCUMENTS

| | | | |
|---|---|---|---|
| 6,313,855 B1* | 11/2001 | Shuping et al. | 345/854 |
| 6,507,865 B1 | 1/2003 | Hanson et al. | |
| 6,535,220 B1 | 3/2003 | Deering et al. | |
| 6,556,724 B1 | 4/2003 | Chang et al. | |
| 6,560,365 B1* | 5/2003 | Nakayama et al. | 382/233 |
| 6,563,498 B1* | 5/2003 | Hirata et al. | 345/419 |
| 6,577,311 B1* | 6/2003 | Crosby et al. | 345/428 |
| 6,785,423 B1* | 8/2004 | Joshi et al. | 382/235 |
| 2003/0083581 A1* | 5/2003 | Taha et al. | 600/509 |
| 2003/0118107 A1* | 6/2003 | Itakura et al. | 375/240.19 |
| 2003/0128881 A1* | 7/2003 | Yagishita et al. | 382/239 |
| 2004/0125133 A1* | 7/2004 | Pea et al. | 345/751 |

OTHER PUBLICATIONS

George Eckel and Ken Jones, "OpenGL Performer Programmer's Guide," 1994, 2000-2002, 1-799, Silicon Graphics, Inc.

Simon Stegmaier, Marcelo Magallon and Thomas Ertl, "A Generic Solution for Hardware-Accelerated Remote Visualization," The Eurographics Association, 2002, 9 pages, Joint Eurographics—IEEE TCVG Symposium on Visualization (2002), Stuttgart, Germany.

"EarthCube Remote Viz," Landmark Graphics, Inc., printed from the website www.lgc.com on Jul. 17, 2003 (pp. 1-6).

"OpenGL Vizserver™ 3.1 Application-Transparent Remote Interactive Visualization and Collaboration," Silicon Graphics, Inc., printed in 2003 (pp. 1-14).

"Chapter 5. Frame and Load Control," excerpt from *OpenGL Performer Programmer's Guide,* Silicon Graphics, Inc., website printed Jun. 9, 2003 (pp. 1-38).

"Guide to Image Compression," derivative of an appendix of the 1993 IMSTAND report prepared by PIRA International for the Commission of the European Communities, printed from the website http://www.diffuse.org/compress.html, printed May 16, 2003 (pp. 1-10).

"Combining Local and Remote Visualization Techniques for Interactive Volume Rendering in Medical Applications," Undated, Visualization and Interactive Systems Group, University of Stuttgart, Germany (pp. 1-5).

"InfiniteReality: A Real-Time Graphics System," Montrym, John S., Baum, Daniel R., Dignam, David L. and Migdal, Christopher J., Silicon Graphics Computer Systems, published 1997, pp. 1-10, ACM Press/Addison-Wesley Publishing Co., New York, NY.

* cited by examiner

Local

Server/Client 600

Collaboration Hub

Server/Collaboration Hub 602

Collaboration Client 604    Collaboration Client 606

Remote Execution

Server 608

Client 610

Remote Execution and Collaboration

Server 612

Client/Collaboration Hub 614

Collaboration Client 616    Collaboration Client 618

ASP

ASP & Collaboration

SYSTEM AND METHOD FOR NETWORK TRANSMISSION OF GRAPHICAL DATA THROUGH A DISTRIBUTED APPLICATION

CROSS REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The invention relates to systems and methods for remotely displaying graphical data, and more particularly to techniques for network transmission and execution of three-dimensional graphical data through a distributed application.

BACKGROUND OF THE INVENTION

As business moves toward distributed working environments, and as transmission of electronic data becomes a valuable business tool, it becomes increasingly important to efficiently transport various types of data through computer networks. Transmission of graphical data may pose unique challenges for a number of reasons, including the relatively large size of various types of graphical data and relatively slow and unreliable network transmission bandwidths. Moreover, the size of the graphical data handled by conventional software applications has increased exponentially, making it impracticable to work with local graphical data from remote locations since there is no economical, efficient, and secure way to remotely access the data.

Graphical data may be stored in a computer as a three dimensional (3-D) graphical model, which is a 3-D representation of a real or computer-generated object. Normally, a particular view of the 3-D graphical model is computed using high-end computer hardware, software, and high-end graphics accelerators before it can be displayed to a user in the form of a two-dimensional (2-D) image. The terms display and image may be used interchangeably when reference is made to a user, client and server. The process of extracting a 2-D image from a 3-D graphical model often includes a technique known as rendering. Rendering is the process of creating views from selected viewing angles and adding 3-D visual cues and qualities, such as lighting, textures, shadows, color and image attributes, stereographic perception, animation, and motion-parallax, to the extracted 3-D graphical model in order to enhance the 2-D image understanding of the model. One technique for rendering graphics is called ray tracing. Another type of rendering is scanline rendering, which renders images one horizontal line at a time instead of object-by-object as in ray tracing.

Various techniques exist for the transmission of, or remote display of, graphical data. These techniques may be implemented on a network of computers. The network of computers may include a server, which is a computer running a particular graphics application and managing various resources, and one or more clients, which are computers that rely on the server to perform one or more operations. Alternatively, the network of computers may include a plurality of nodes. The nodes may be computers that are configured to share information without functioning in a structured client-server relationship.

Various image compression techniques may be used to reduce the bandwidth required for transmitting 3-D models or 2-D images locally or across a network. For example, a 3-D model or 2-D image may be compressed at a server or at a first node and transmitted using hardware image compression and hardware data compression techniques. The compressed data may then be decompressed at a client or at a second node in order to image the original data. Conventional image compression techniques, such as transform coding, vector quantisation, segmentation and approximation, spline approximation, wavelet compression, or fractal coding, often lead to lossy or distorted images. In addition, lossy techniques often lead to image degradation at each compression stage. As a result, lossless image compression techniques, including run-length encoding, Huffman encoding, Lempel/Ziv coding, or area coding, were developed.

These conventional techniques, nevertheless, suffer from inherent disadvantages. For example, both the server or first node and the client or second node must perform a compression or decompression step, which is an inefficient use of computing or computer resources. Furthermore, some conventional techniques may be difficult to implement, particularly across multiple heterogeneous platforms normally found in all computing environments. Moreover, lossless image compression techniques may suffer from compression ratios that are not as high as conventional lossy techniques.

U.S. Pat. No. 6,219,057 describes a collaborative work environment for allowing remote users to manipulate a 3-D model using conventional techniques. In this system, each node or client requires its own local copy of the original 3-D model. A local copy of the original 3-D model is rendered at each node or client. Each user may manipulate its local copy of the original 3-D model using a transformation matrix. The transformation matrix is a set of data that represents a manipulation of the original 3-D model. The transformation matrix is used to communicate the viewing position and orientation of the manipulated 3-D model to other users, who use the information to render a new local copy based on the application of the transformation matrix to the original local copy. The system disclosed in the '057 patent is disadvantaged to the extent that it requires significant system resources at each node in the network. For example, each node requires high-end graphics-specific hardware that is sufficient to render the 3-D model. In addition, the rendering operation may require additional memory, system bus bandwidth, and other resources on each node in the network. This usually affects the performance of other applications running on each node.

Furthermore, the nature of the collaborative environment described by the '057 patent may not be practical when some of the 3-D model information is confidential or cannot reside on the client or node because the 3-D model is comprised of data that exceeds the system capacity of the client or node.

Other conventional systems that are available for displaying 3-D graphical data include OpenGL Performer® and OpenGL Vizserver™—both applications offered by Silicon Graphics, Inc. (SGI®). OpenGL Performer® includes a "Dynamic Video Resolution" feature that reduces the size of the rendered image, and correspondingly, the number of rendered pixels. As a result, the speed (frame rate) at which all processing is completed before updating the display with a new image is enhanced. Afterwards, specialized SGI® video hardware enlarges the images to the original size. This is accomplished by using a technique known as bipolar filtering to enlarge the image. In this way, the image is the correct size, but it contains a reduced number of pixels.

OpenGL Performer® is, nevertheless, disadvantaged to the extent that it requires specialized SGI video hardware on any machine that displays an object image. Furthermore, this system does not enable remote rendering, but is, rather, optimized to achieve high frame rates locally. While it can be used in conjunction with remote-enabling products in order to transmit 3-D graphics information, this requires enlarging the image at each node in the network. Therefore, each node must contain specialized video hardware. OpenGL Vizserver™ is similarly disadvantaged. For example, OpenGL Vizserver™ requires specialized hardware in the form of multiple (five) compression modules that compress/decompress the frames of a rendered 3-D graphics model. These compression modules reside at the client and server thus, reducing performance at each end when performing other necessary tasks and interacting with the 3-D graphics model. OpenGL Vizserver™ may also require additional customized modules which adversely impact the system resources of the client and server. In either application using OpenGL Performer®, OpenGL Vizserver™, or both, the cost of implementing such systems is significant.

Another example of a conventional system for displaying 3-D graphical data includes EarthCube® RemoteViz offered by Landmark Graphics Corporation. Like other conventional remote collaboration systems, EarthCube® RemoteViz requires specialized hardware in the form of image based or video based compression packages that are expensive and restrict the client and server system resources from performing other necessary functions.

As demonstrated by the state of the art, there is a need, among other things, for an efficient system that can remotely display 3-D graphical data through a distributed application, however, does not require specialized hardware or software on every node in the network. There is also a need for a single executable application that may be used in a collaborative way, yet may selectively grant control to remote users and runs on most existing client platforms and operating systems. In short, there is a need for a system that operates on most hardware platforms and enables high remote frame rates, transparent remote collaboration processes, and per-component adaptive resolutions while eliminating the need for any client processes, daemons, hardware image compression, software image compression, stream compression and/or data compression.

SUMMARY OF THE INVENTION

An embodiment of the invention addressing these and other needs in the art includes a method of imaging graphical data on one or more clients. The method includes rendering 3-D graphical information in the form of a 3-D model at a local server and using a local server graphics accelerator, sometimes referred to herein as a graphics card, to reduce the network bandwidth requirements (transmission size) of the graphical information by dynamically processing and applying a scaling factor to the 3-D graphical information. The method further includes transmitting the scaled 3-D graphical information and/or other information from the server's graphics accelerator memory to at least one client's graphics accelerator memory and re-scaling the 3-D graphical information to display a mirror image of the original 3-D graphical information to all available clients.

In one particular embodiment, using the local server graphics accelerator to process and apply a scaling factor to the 3-D graphical data includes retrieving the rendered graphic accelerator memory information from the server and binding the graphical information into texture memory to form a texture map, or directly rendering to a texture. This also includes rendering the graphical information into a memory buffer of the server's graphic accelerator, determining a client's native graphics card-pixel format, and reformatting the pixel format of the 3-D graphical information to match the client's native pixel format.

In another embodiment, the invention includes computer-executable instructions, executable to perform the steps of rendering graphical information in the form of a 3-D model at a local server and exclusively using a local server graphics accelerator to reduce the network bandwidth requirements of the 3-D graphical information by dynamically processing and applying a scaling factor to the 3-D graphical information. The computer-executable instructions are further executable to perform the steps of transmitting the scaled 3-D graphical information and/or other information from the server's graphics accelerator memory to at least one client's graphics accelerator memory and re-scaling the 3-D graphical information to display a mirror image of the original 3-D graphical information to all available clients.

In yet another embodiment, a server system is used for displaying graphical data at a remote client and includes a 3-D application rendering module configured to render graphical information, a 3-D graphics accelerator configured to reduce the bandwidth requirements of the graphical information by dynamically processing and applying a scaling factor to the graphical information, and a framebuffer memory configured to store the scaled 3-D graphical information. This system may also include a windows application program interface (API) configured to transmit window system and graphic protocol to the client to enable the client to open one or more display windows. The system further includes a graphics API configured to transmit a scaled-down image of the 3-D graphical information from the framebuffer memory to the client.

In yet another embodiment, a method for displaying graphical data at a client includes receiving windows protocols from a server, receiving pre-rendered 3-D graphical information from the server, and mapping the 3-D graphical information directly into a graphics accelerator memory. The method also includes executing the window system protocol and displaying the pre-rendered 3-D graphical information.

BRIEF DESCRIPTION OF THE DRAWINGS

The invention will be described with reference to the accompanying drawings, in which like elements are referenced with like reference numerals, and in which.

DETAILED DESCRIPTION OF EMBODIMENTS

Figure 1:
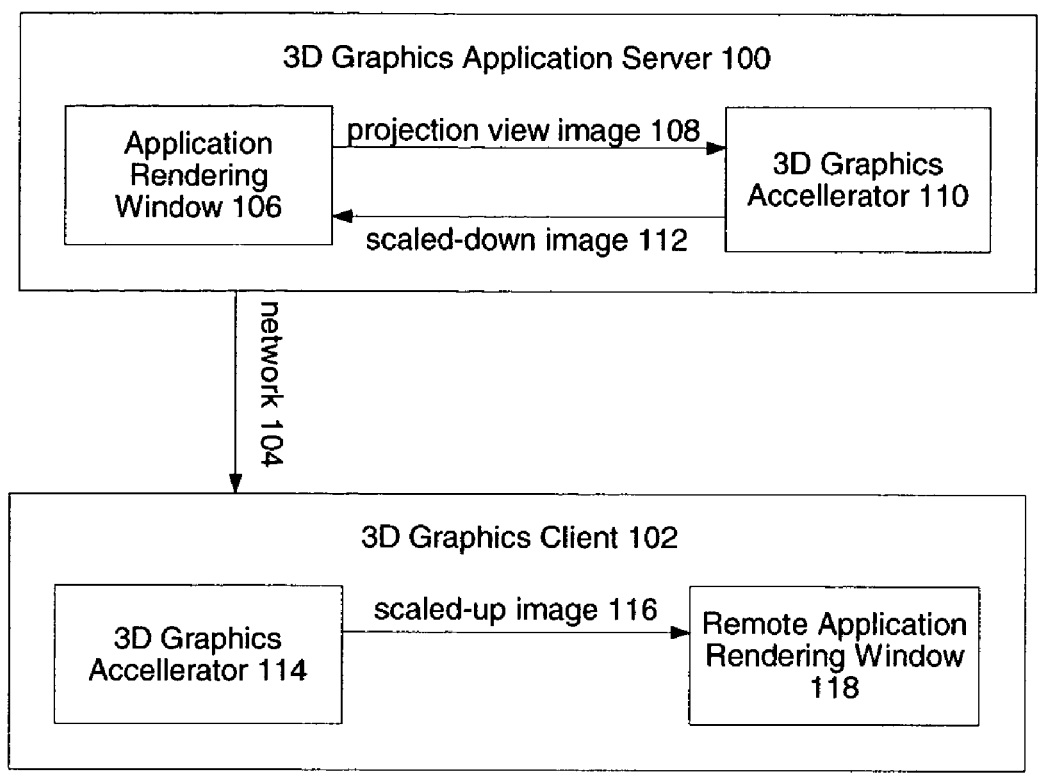
FIG. 1 is a block diagram of a system for remotely displaying graphics in accordance with an embodiment of the invention.

FIG. 1 is a block diagram of a system for remotely displaying graphics in accordance with an embodiment of the invention. The system may include a 3-D graphics application server 100 and 3-D graphics client 102, which are referred to herein as the server 100 and client 102. In some applications, the server 100 and client 102 may be referred to collectively as nodes. The server 100 may be any computer that is configured to run a distributed application and remotely display graphical data and other information at the client 102. The server 100 may store a 3-D model to be rendered and imaged to remote clients. The server 100 may also manage resources that are used by one or more of the clients 102. These resources may include specialized rendered graphical data and other information generated by the distributed application.

The client 102 may be a computer that uses resources provided by the server 100. The client 102 may be configured to remotely display graphical data. In one embodiment, the client 102 may be configured to remotely display graphical data rendered exclusively by the server 100 and based on a 3-D model stored on the server 100. In this embodiment, the client 102 may be configured to display the graphical data using a windows API to execute windows and other graphics protocols communicated by the server 100. This may allow the client 102 to remotely display graphical data without actually running the distributed application, and without running a daemon or other process. In other embodiments, the client 102 may itself function as a server in conjunction with other computers.

The server 100 may be connected to the client 102 via a network 104. The network 104 may be any logical connection that enables the server 100 and client 102 to exchange information. In one embodiment, the network 104 may comprise a local area network (LAN), a wide area network (WAN), the internet, or another network. The network 104 may also comprise a wired network, a wireless network, or some combination thereof.

The server 100 may include an application rendering window 106, and 3-D graphics accelerator 110. The application rendering window 106 contains memory of a projection view image 108 that represents the rendered 3-D model. The projection view image 108 is processed by the 3-D graphics accelerator 110 to produce a scaled down image 112 that is stored in the application rendering window 106 at the same location. The 3-D graphics accelerator 110 may include specialized graphics hardware designed to manipulate graphical data stored in its memory. Depending on the type of memory used by the 3-D graphics accelerator 110, the application rendering window 106 may be used to display the scaled-down image 112 to a user at the server 100, or may be made totally invisible to the user. The scaled-down image 112 stored by the application rendering window 106 may be transmitted via the network 104 to a 3-D graphics accelerator 114 for the client 102. Transmitting the scaled-down image 112 may include simultaneously transmitting additional information, such as windows protocols, user interface (UI) information, or other application information directly from the memory of the 3-D graphics accelerator 110 to the memory of the 3-D graphics accelerator 114.

The 3-D graphics accelerator 110 normally includes any commercially available high performance graphics accelerator, and the 3-D graphics accelerator 114 may include any OpenGL® compatible games-class graphics accelerator such as the GeForce® and Quadro® graphics cards marketed by NVIDIA®, which are otherwise well known for their local image processing and editing capabilities. The 3-D graphics accelerator 110 and 3-D graphics accelerator 114 include memory and a GPU. In one embodiment, the memory for the 3-D graphics accelerators 110 and 114 may include a framebuffer, textures windows, and other memory objects. Alternatively, these objects may exist as memory independent from the 3-D graphics accelerator.

In reference to FIG. 1, the application rendering window 106 resides in the memory of the 3-D graphics accelerator 110 at the server 100. Similarly, the remote application rendering window 118 resides in the memory of the 3-D graphics accelerator 114 at the client 102. The 3-D graphics accelerator 114 may be configured to substantially reproduce the projection view image 108 in the form of a scaled-up image 116. The scaled-up image 116 may then be displayed on the remote application rendereing window 118.

Figure 2:
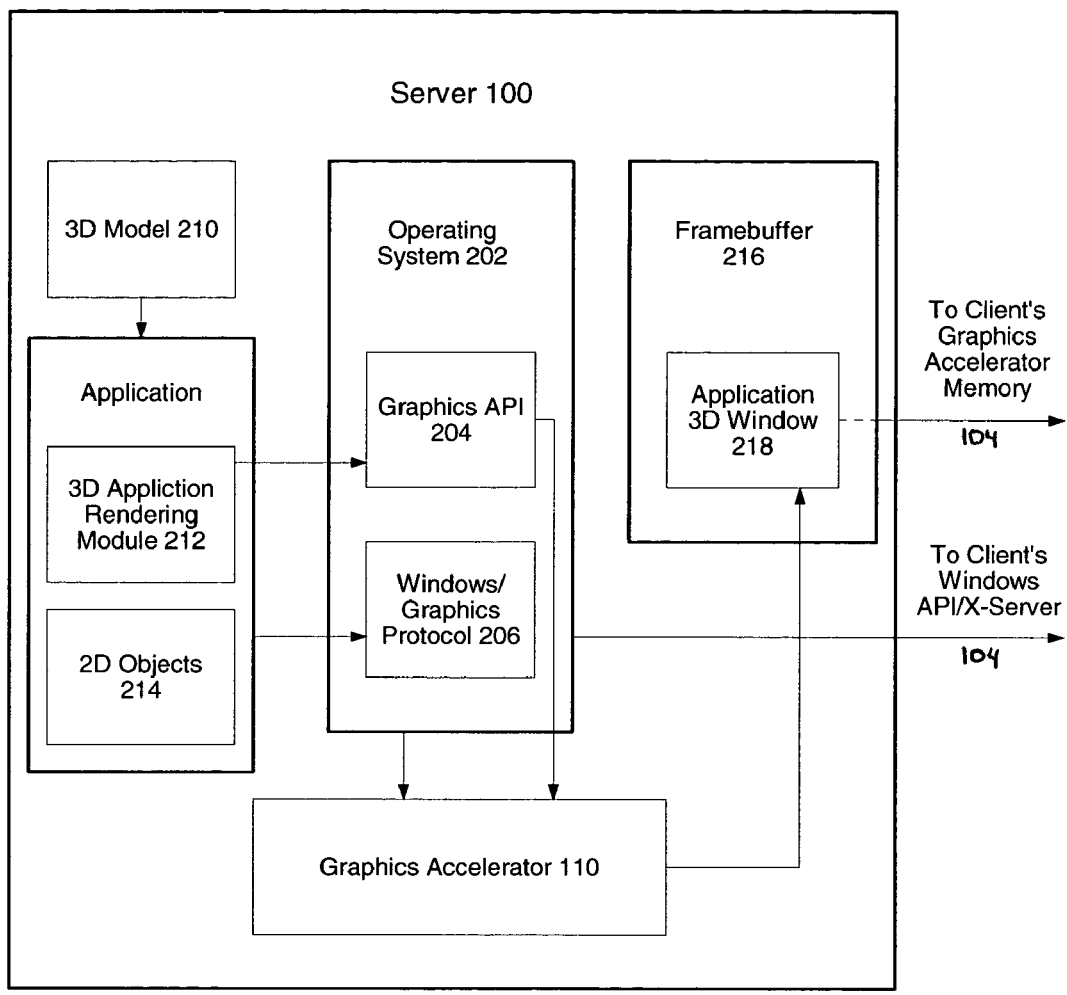
FIG. 2 is a block diagram of a server system in accordance with an embodiment of the invention.

FIG. 2 is a block diagram of the server 100 in accordance with an embodiment of the invention. The server 100 may include an operating system 202. The operating system 202 may include a graphics API 204 and a windows/graphics protocol 206. The graphics API 204 may include a set of routines, protocols, and tools for building graphics software applications, such as X11 and Open GL®, which are open source software. The windows/graphics protocol 206 may include a set of routines, protocols, and tools for managing display windows for various applications, such as the open source X-server, or any other windows emulator.

The server 100 may also include a 3-D model 210 of a real or computer-generated object. The 3-D model 210 contains all the necessary model information that is rendered by the 3-D application rendering module 212 to create the projection view image 108.

The graphics API 204 is used by the 3-D application rendering module 212 to send the proper commands to the 3-D graphics accelerator 110 in order to create the projection view image 108. In some applications, it may be preferable to store the projection view image 108 in the framebuffer 216 in order to display a visible object on a monitor (not shown) for the server 100. The server 100 may also be used to transmit UI information for 2-D objects 214 through the windows/graphics protocol 206 to the windows API/X-server 304 at the client 102. The 3-D rendering module 212 and 2-D objects 214 define the distributed application that resides on the server 100.

The projection view image 108 may be scaled down by the 3-D graphics accelerator 110. Scaling may include reducing the size of the projection view image 108 based on a dynamically selected sealing factor. The scaling factor used to scale down the projeclion view image 108 may be determined by the performance requiremats of a particular client or adaptively depending on the workflow in use. The scaling process is described in more detail with reference to FIG. 4.

The windows/graphics protocol 206 may be used to open an application 3-D window 218 and display the scaled-down image 112 stored in the framebuffer 216. The application 3-D window 218 may also contain windows information from the windows/graphics protocol 206. Application 3-D window 218 and application rendering window 106 may be related to the extent that they perform similar functions and reside in the memory of the 3-D graphics accelerator 110.

Application 3-D window 218 preferably includes memory from the framebuffer 216. The memory from the framebuffer 216, in some embodiments, refers to the visible memory of the 3-D graphics accelerator 110 that may be displayed on a monitor (not shown) at the server 100.

Windows/graphics protocol 206 may also be used to open a window located at the client 102. In addition, the application 3-D window 218 may be used to transmit information to the client 102. In some embodiments, information from the application 3-D window 218 may be transmitted to the client 102 directly from the framebuffer 216. The application 3-D window 218 may then be displayed at the client 102 in a window opened by windows API/X-server 304 once memory from the 3-D graphics accelerator 110 is mapped into the respective memory for the 3-D graphics accelerator 114.

Figure 3:
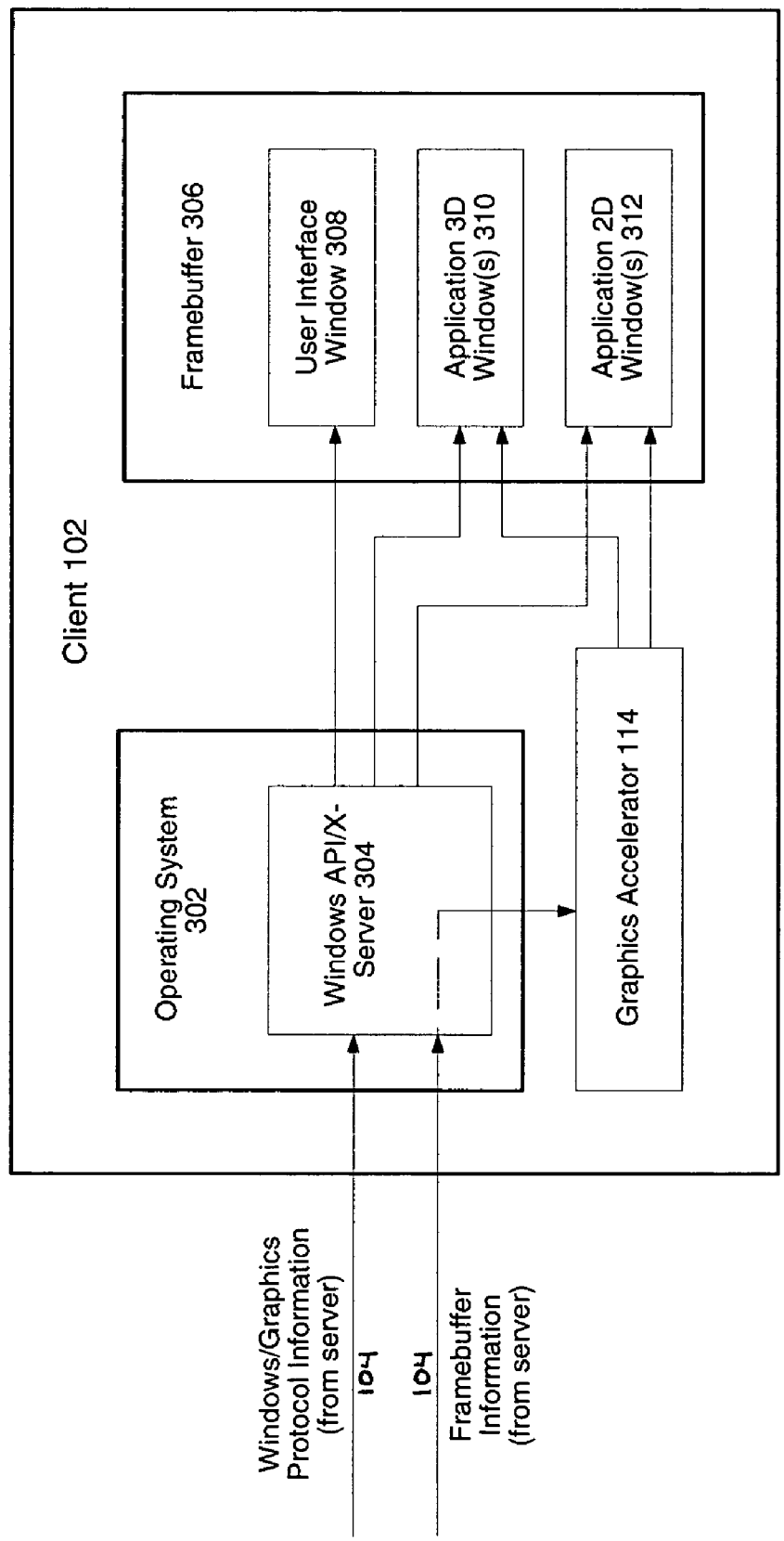
FIG. 3 is a block diagram of a client system in accordance with an embodiment of the invention.

FIG. 3 is a block diagram of the client 102 in accordance with an embodiment of the invention. The client 102 may include an operating system 302. The operating system 302 may include a windows API/X-Server 304. The windows API/X-Server 304 may include a set of routines, protocols, or tools for managing display windows for various applications, such as an X windowing system or an X windowing emulator.

The client 102 may receive information from the server 100. The information may be received by the windows API/X-Server 304. The information received from the server 100 may include information that contains instructions or protocols to open one or more display windows, or to otherwise display data from the windows/graphics protocol 206. The information received from the server 100 may also include scaled-down image 112 and/or other graphical information from the framebuffer 216.

The information from the framebuffer 216 is transmitted to the 3-D graphics accelerator 114, which is preferably used to render the scaled-up image 116. The GPU for the 3-D graphics accelerator 114 may be used to perform bilinear interpolation, or other intended functions, to render the scaled-up image 116. This process may also include the application of texture filters by the 3-D graphics accelerator 114, which may result in a smoother, more continuous image.

The windows API/X-Server 304 may be used to open one or more windows in order to display the scaled-up image 116 and other data. For example, the API/X-server 304 may be used to open the application 3-D window(s) 310 that displays the scaled-up image 116. Additionally, the API/X-server 304 may be used to open the user interface window 308 that displays UI information, such as text and other menu operational objects, and the application 2-D window(s) 312 that displays other 2-D images like color maps and other objects.

User interface window 308, application 3-D window(s) 310, and application 2D window(s) 312 are preferably part of the framebuffer 306 that may reside in the memory of the 3-D graphics accelerator 114. In this embodiment, the user interface window 308, application 3-D window(s) 310, and application 2D window(s) 312 may be displayed on a display device (not shown) located at the client 102. Application 3-D window(s) 310 and remote application rendering window 118 may be related to the extent that they perform similar functions and reside in the memory of the 3-D graphics accelerator 114.

Figure 4:
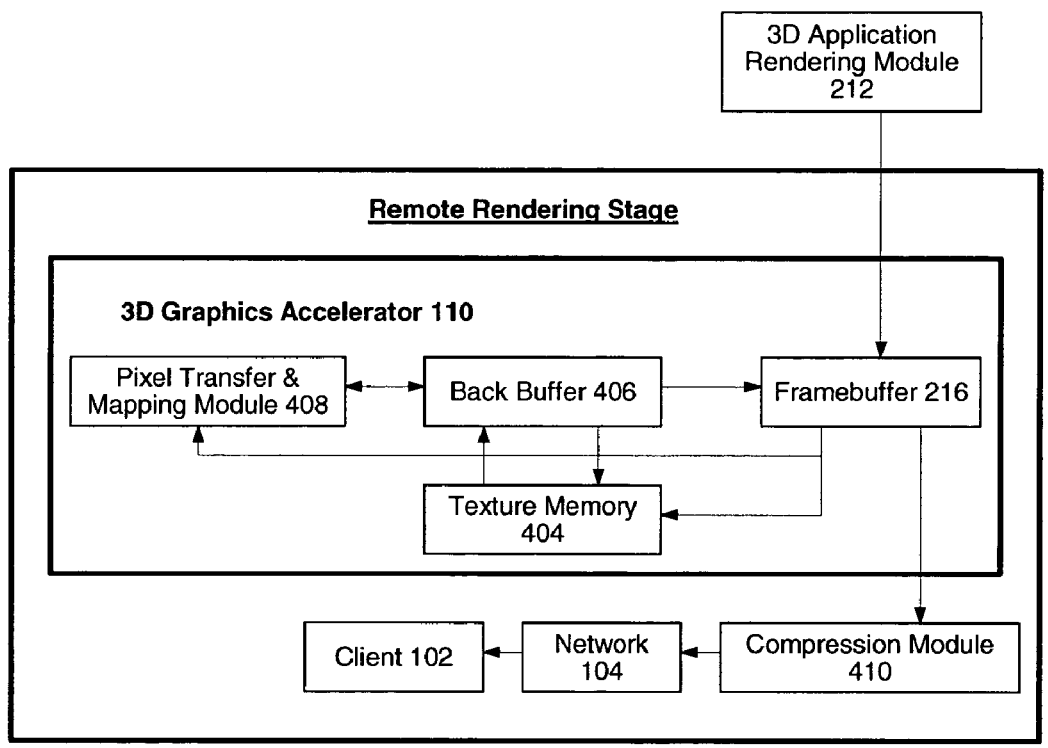
FIG. 4 is a block diagram of a server graphics accelerator in accordance with an embodiment of the invention.

Referring now to FIG. 4, a block diagram of the 3-D graphics accelerator 110 is shown in accordance with an embodiment of the invention. The results of the 3-D application rendering module 212 (i.e., the projection view image 108) may be stored in an array of discrete information units. Each of these discrete information units may be referred to as a component chunk. Each component chunk may comprise an array of values associated with color channel elements. For example, in one implementation, each component chunk includes values corresponding to the colors red, green, and blue (RGB) in any predetermined order. In another implementation, each component chunk may include values corresponding to the colors red, green, blue, and an opacity factor alpha (RGBA) in any predetermined order.

The 3-D graphics accelerator 110 may also include texture memory 404, back buffer 406, and a pixel transfer and mapping module 408. The frame buffer 216, texture memory 404, and back buffer 406, in one embodiment, exist in the memory of the 3-D graphics accelerator 110. The texture memory 404, also known as texture cache, may include specialized memory that is set aside for graphics operations. The component chunk information may be bound to the texture memory 404, which may include loading and locking component chunk information into the texture memory 404. The result may be referred to as a texture map. Binding the component chunk information to the texture memory 404 may also include converting the component chunk information into the native processing format of the server 100, which may lead to faster processing performance inside the 3-D graphics accelerator 110. This may be accomplished using a pixel transfer and mapping module 408 that is commonly found in most 3-D graphics cards. Because the 3-D graphics accelerator 110 is capable of reformatting the component chunk information to match the server's and client's native processing format, the CPU, the main memory, the bus bandwidth, and other computing system resources can be utilized for other processes or tasks.

The information contained in the texture memory 404 may be scaled and transferred to a visible back buffer 406. A scaling factor may be selected or specified by a user or may be calculated or determined by a computer. The scaling factor may be specified or determined by the network bandwidth transmission requirements. This may depend on the performance requirements or workflows being used on a particular client 102. For example, if a user requires a higher resolution, the scaling factor may be adaptively decreased, thereby increasing the amount of data transmitted until a desired resolution and performance are achieved. Alternatively, if a user is using a very slow bandwidth, the scaling factor may be increased, thereby reducing the amount of data transmitted until a desired resolution and interactive performance are achieved. The information contained in the texture memory 404 may also be scaled to a size that is proportional to the scaling factor. For example, in one embodiment, the information contained in the texture memory 404 may be scaled by a factor of $1/SF^2$, where SF is the scaling factor.

Thus, the information contained in the texture memory 404 (i.e., the texture map) may be scaled down by applying it to a polygon, such as a quadrilateral, having a scaling factor of $1/SF$ with respect to the projection view image 108. The polygon is rendered directly into the back buffer 406. As a result, all operations leading to the scaled-down image 112 may be performed exclusively within the 3-D graphics accelerator 110, which enables the server resources to perform other tasks.

The scaled information in the back buffer 406 may be converted into a format that is more readily understood by a particular client 102 using the pixel transfer and mapping module 408. The pixel transfer and mapping module 408 may thus, be used to reformat the scaled information received from the back buffer 406, or framebuffer 216, to match the format supported by the 3-D graphics accelerator 114. This technique may include converting the scaled information into any well known format, including RGB or RGBA combinations. The scaled information that is converted in the manner thus described may be transmitted from the 3-D graphics accelerator 110 to one or more clients 102 through the network 104.

Alternatively, the scaled information that is converted may be transmitted to a compression module 410. The compression module 410 may be located on the server 100, or elsewhere. The compression module 410 may apply additional compression techniques to the scaled information before it is transmitted to the client 102 via the network 104. The compression module 410 may apply compression techniques such as JPEG, MPEG, RLE, LBX, fractal coding, wavelet compression, or other well known compression techniques.

In one embodiment of the invention, a user located at the server 100 or the client 102 may desire to interactively alter or manipulate the projection view 108 which may be done by using 2-D windowing and cursor information. The graphical information may also be manipulated automatically by the server 100 or the client 102 when, for example, the graphical information is updated. The graphical information may be displayed or imaged using lossy factors while it is being manipulated and it may be displayed using lossless factors when it is not being manipulated.

Figure 5:
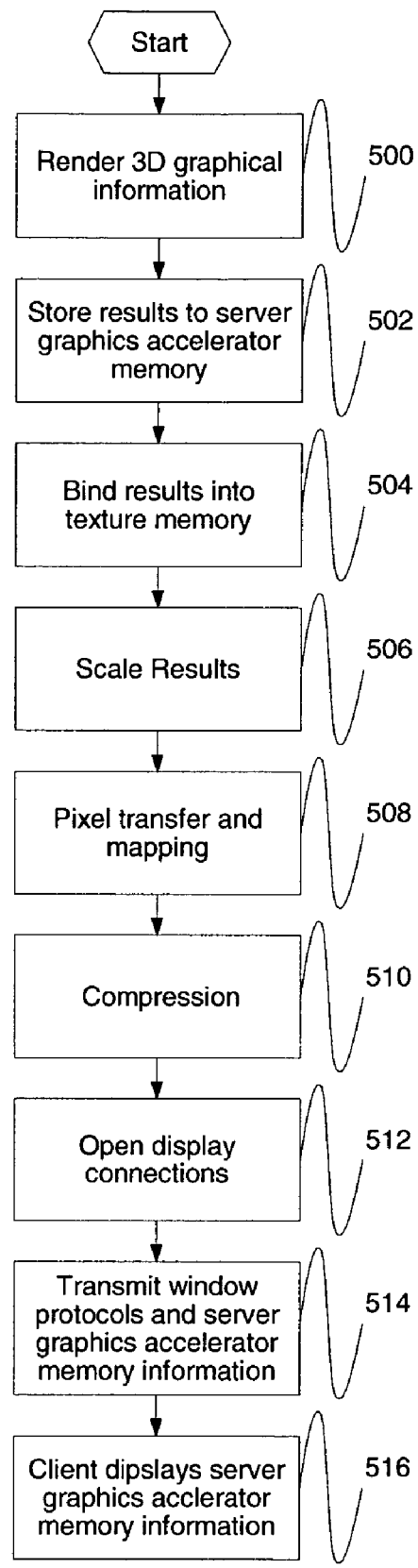
FIG. 5 is a flow chart depicting a method for remotely displaying graphics in accordance with an embodiment of the invention.

Referring now to FIG. 5, a flow chart of a method for remotely displaying graphics depicts one embodiment of the invention. The method may begin at step 500 by rendering 3-D graphical information from a 3-D model 210. Rendering 3-D graphical information in step 500 may include adding realism to computer graphics by adding three-dimensional attributes and qualities such as textures, lighting, shadows, and variations in color and shade. Rendering 3-D graphical information in step 500 may also include ray tracing, scanline rendering, or other well known rendering techniques.

Rendering 3-D graphical information may be performed, for example, by the 3-D application rendering module 212. The 3-D application rendering module 212 may use the graphics API 204 as described in reference to FIG. 2. Step 500 may produce any combination of 3-D information, 2-D information, and UI information.

In step 502, the results of step 500 may be stored in the memory of the 3-D graphics accelerator 110 (i.e., the framebuffer 216, texture memory 404, back buffer 406, or any other type of graphics card memory). The results stored during step 502 may be stored as component chunks and optionally displayed to a user at the server 100. Each component chunk may be an array of values associated with color channel elements as described in reference to FIG. 4.

Step 504 binds the results of step 500 into texture memory 404. Step 504 may include loading and locking the results of step 500 into texture memory 404. The results of step 504 may be referred to as a binded texture map. Step 504 may also include converting the results (texture map) into the native processing format of the server 100 as described in reference to FIG. 4. This conversion technique may be accomplished using the pixel transfer and mapping module 408, which may lead to faster processing performance inside the 3-D graphics accelerator 110, and enable the CPU main memory, bus bandwidth and other system resources to be utilized for other tasks.

In step 506, the result of step 504 may be scaled by selecting, specifying, or otherwise determining a scaling factor and rendering the scaled results to the memory for the 3-D graphics accelerator 110 in the manner described in reference to FIG. 4. The scaling factor may be specified by a user or determined by a computer based on the network bandwidth reduction that is desired or necessary. This may depend on the performance requirements of a particular client 102. For example, step 506 may include scaling the information contained in the texture memory 404 to a size that is proportional to the scaling factor. In one embodiment, this includes scaling the information contained in the texture memory 404 by a factor of $1/SF^2$, where SF is the scaling factor.

Step 508 converts the scaled results of step 506 into a format that is more readily understood by a particular client 102. Step 508 may be performed also by using the pixel transfer and mapping module 408. The pixel transfer and mapping module 408 may thus, be used to reformat the scaled results of step 506 to match the format supported by the 3-D graphics accelerator 114 for the client 102 as described in reference to FIG. 4. This technique may include converting the scaled results of step 506 into any well known format, including RGB or RGBA combinations. The results of step 508 may be transmitted to one or more clients 102 via the network 104.

Alternatively, the results of step 508 may be compressed in step 510 using a compression module 410. Step 510 may be performed on the server 100, or elsewhere. Step 510 may include applying additional compression techniques to the results of step 508 before being transmitted to the client 102 via the network 104. Step 510 may include applying compression techniques such as JPEG, MPEG, RLE, LBX, fractal coding, wavelet compression, or other well known compression techniques.

Steps 504, 506, and 508 may be performed exclusively within the memory and processing units of the 3-D graphics accelerator 110. As a result, the CPU, the main memory, the bus bandwidth, and other system resources may be used for other processes or tasks.

In one embodiment of the invention, a user located at the server 100 or the client 102 may desire to interactively alter or manipulate the graphical information rendered from the 3-D application rendering model 212. The graphical information may also be manipulated automatically by the server 100 or the client 102 when, for example, the graphical information is updated. The graphical information may be displayed or imaged using lossy factors while it is being manipulated and it may be displayed using lossless factors when it is not being manipulated.

One or more display connections may be opened in step 512. Step 512 may include an application running on the server 100 that can open one or more display connections to the remote windowing systems for a particular client 102. Step 512 may therefore, be performed using the graphics API 204 and windows/graphics protocol 206 as described in reference to FIG. 2. The empty client windows that are opened may be managed by a client window manager system.

In step 514, protocols and information from the 3-D graphics accelerator 110 may be transmitted to the client 102 via the network 104. Transmitting protocols may include transmitting windowing protocol, window managing protocol, or graphics protocol via the network 104. In one embodiment, the client 102 may execute window system protocols and commands without running any client side processes or daemons. Transmitting information from the 3-D graphics accelerator 110 may include transmitting "raw" or unprocessed memory from the 3-D graphics accelerator 110 to the 3-D graphics accelerator 114. Alternatively, information from the 3-D graphics accelerator 110 may be compressed, as described in reference to FIG. 4, before it is transmitted to the client 102.

In Step 516, the information from the memory of the 3-D graphics accelerator 114 may be displayed to the client 102 on the opened windows using the transmitted protocols.

In summary, a single executable instance of an application comprising the 3-D application rendering module 212 and 2-D objects 214 may be located on the server 100. The server 100 can therefore, remotely open various display connections as described in reference to step 512. This allows the server 100 to write raw memory from the 3-D graphics accelerator 110 directly to multiple clients using different graphics memory resolutions and different scaling factors. This also allows the server 100 to control local and remote window refreshes so that windows are refreshed only as needed and only on the particular windows that need it. It may also allow the application to control security settings for specific windows or to use adaptive lossy or lossless compression for specific windows. Furthermore, the fact that rendering (step 500) need not be performed by the client 102 may reduce or eliminate many conventional system requirements for the client 102.

FIGS. 6 *a–f* illustrate various optional networking environments in accordance with multiple embodiments of the invention. The computers illustrated in FIGS. 6 *a–f* may include desktop computers, laptop computers, dedicated servers, supercomputers, personal digital assistants (PDA's), other well known computing devices, or any combination thereof.

Figure 6A:
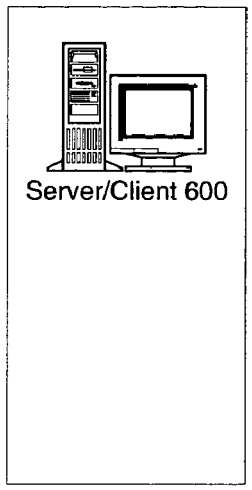
FIGS. 6 a–f illustrate enabled networking environments in accordance with an embodiment of the invention.

FIG. 6*a* illustrates a local environment. The local environment may include locally running a server/client 600. The server/client 600 may render and display 3-D graphical data.

Figure 6B:
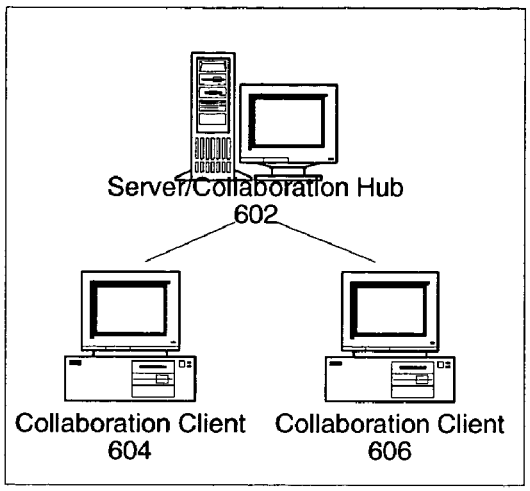

FIG. 6*b* illustrates a collaboration hub-networking environment. A collaboration hub may include any computer that transmits data to and receives data from multiple other computers. A collaboration hub may also be configured to incorporate changes received from multiple other computers into a single data object or other data instance. A collaboration hub may also control application security settings for one or more other computers. The collaboration hub networking environment may include a server/collaboration hub 602, which may render and display 3-D graphical data as well as functioning as a collaboration hub. The collaboration hub networking environment may also include one or more collaboration clients 604, 606 that remotely display 3-D graphical data that is rendered on the server/collaboration hub 602. In one embodiment, the collaboration clients 604, 606 may also alter or manipulate the rendered data. These changes may be tracked, processed, or stored by the server/collaboration hub 602.

Figure 6C:
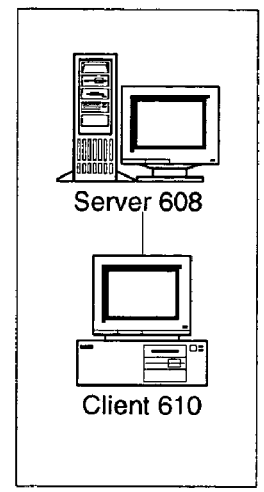

FIG. 6*c* illustrates a remote execution networking environment. The remote execution networking environment may include a server 608, which renders and displays 3-D graphical data. The remote execution networking environment may also include one or more clients 610 that remotely display 3-D graphical data rendered on the server 608.

Figure 6D:
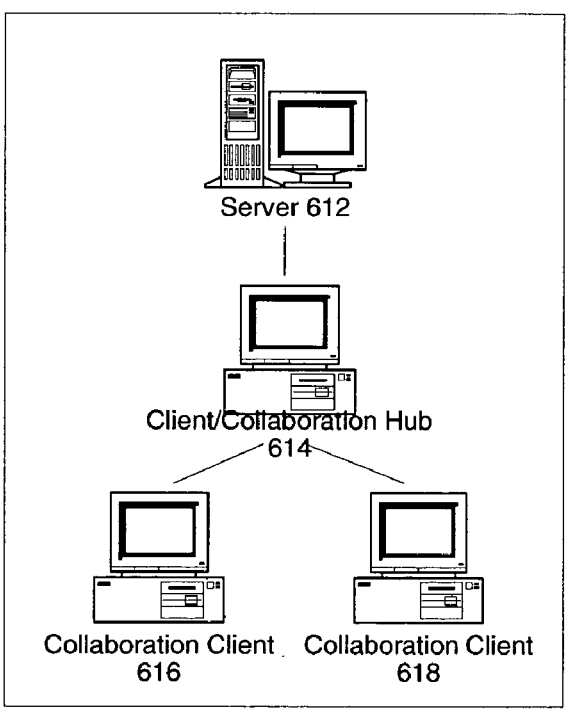

FIG. 6*d* illustrates a remote execution and collaboration networking environment. The remote execution and collaboration networking environment may include a server 612, which visibly or invisibly renders and displays 3-D graphical data. The remote execution and collaboration networking environment may also include one or more client/collaboration hubs 614. Each client/collaboration hub 614 may remotely display 3-D graphical data that is rendered on the server 612. Each client/collaboration hub 614 may transmit data to, and receive data from, one or more collaboration clients 616, 618. Each client/collaboration hub 614 may also be configured to incorporate changes received from collaboration clients 616, 618 into a single data object or other data instance. The client/collaboration hub 614 may also control security settings for collaboration clients 616, 618. The collaboration clients 616, 618 may remotely display 3-D graphical data that is rendered on the server 612 and transmitted via the client/collaboration hub 614. In one embodiment, the collaboration clients 616, 618 may also alter or manipulate the rendered data. These changes may be tracked, processed, or stored by each client/collaboration hub 614 through window and display state changes that are sent to the server 612 for processing and synchronization of all client interactions.

Figure 6E:
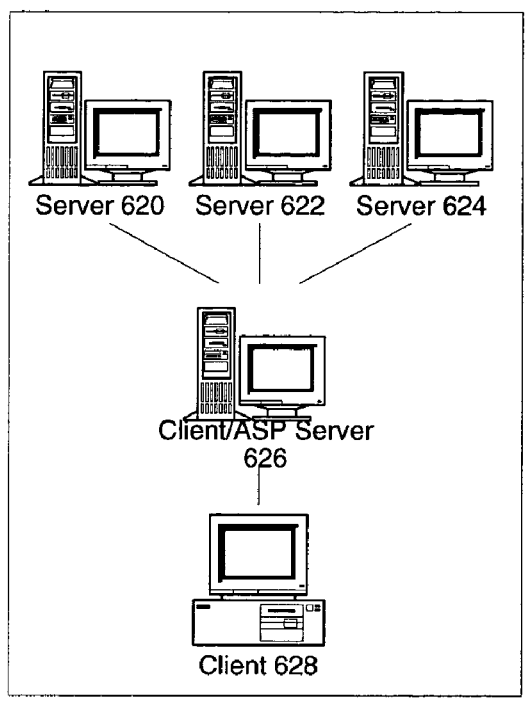

FIG. 6*e* illustrates an application service provider (ASP) networking environment. The ASP networking environment may include one or more servers 620, 622, 624, which render and display 3-D graphical data. The ASP networking environment may also include one or more client/ASP servers 626. Each client/ASP server 626 may receive 3-D graphical data that is rendered on the servers 620, 622, 624. Each client/ASP server 626 may include a computer that is configured to manage and distribute software-based services and solutions to customers across a wide area or other network from a central data center. In one embodiment, each client/ASP server 626 may be a third-party server that is owned or operated by an entity separate from the entity owning and operating the servers 620, 622, 624 or the client 628. Each client/ASP server 626 may be an enterprise ASP, which is designed to deliver high-end business applications; a local or regional ASP, which is designed to supply a wide variety of application services for smaller businesses in a local area; a specialist ASP, which is designed to provide applications for a specific need; a vertical market ASP, which is designed to provide support to a specific industry; or a volume business ASP, which is designed to supply small or medium-sized businesses with prepackaged application services in volume. The ASP networking environment may also include one or more clients 628 that remotely display 3-D graphical data rendered on the servers 620, 622, 624 and transmit the 3-D graphical data to each client 628 via the client/ASP server 626.

Figure 6F:
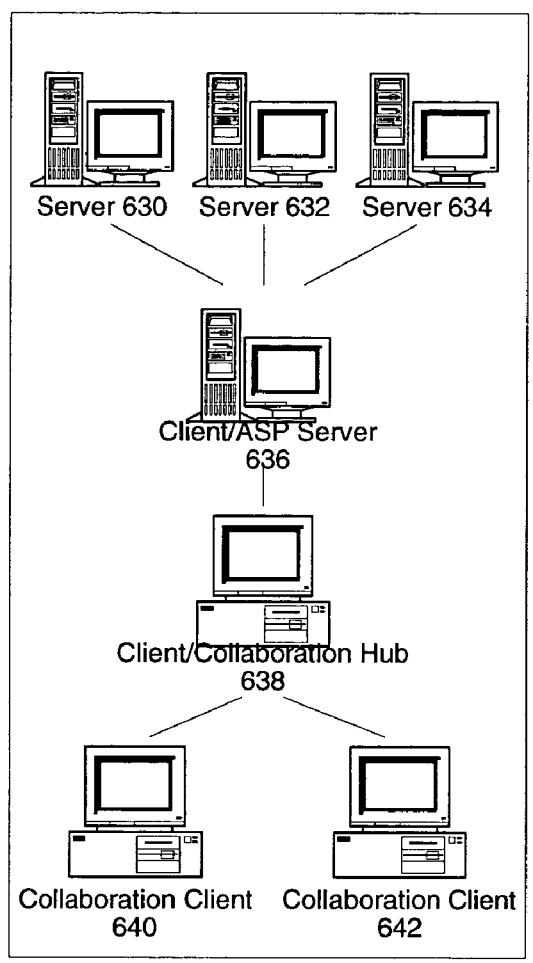

FIG. 6*f* illustrates an ASP and collaboration networking environment. The ASP and collaboration networking environment may include one or more servers 630, 632, 634, which render and display 3-D graphical data. The ASP and collaboration networking environment may also include one or more client/ASP servers 636. Each client/ASP server 636 may receive 3-D graphical data that is rendered on the servers 630, 632, 634. Each client/ASP server 636 may include a computer that is configured to manage and distribute software-based services and solutions to customers across a wide area or other network from a central data center. In one embodiment, each client/ASP server 636 may include a third-party server that is owned or operated by an entity separate from the entity owning and operating the servers 630, 632, 634, the client/collaboration hub 638, or the client 640, 642. Each client/ASP server 636 may be an enterprise ASP, which is designed to deliver high-end business applications; a local or regional ASP, which is designed to supply a wide variety of application services for smaller businesses in a local area; a specialist ASP, which is designed to provide applications for a specific need; a vertical market ASP, which is designed to provide support to a specific industry; or a volume business ASP, which is designed to supply small or medium-sized businesses with prepackaged application services in volume.

The ASP and collaboration networking environment may also include one or more client/collaboration hubs 638. Each client/collaboration hub 638 may remotely display 3-D graphical data that is rendered on the servers 630, 632, 634 and is transmitted via the client/ASP server 636. Each client/collaboration hub 638 may transmit data to and receive data from multiple clients 640, 642. The client/collaboration hub 638 may be configured to incorporate changes received from clients 640, 642 into a single data object or other data instance. Each client/collaboration hub 638 may also control security settings for the clients 640, 642. The clients 640, 642 may also remotely display 3-D graphical data that is rendered on the servers 630, 632, 634, and transmitted via the client/ASP server 636 and the client/collaboration hub 638. In another embodiment, the collaboration clients 640, 642 may also alter or manipulate the rendered data through window and display state changes that are sent to the servers 630, 632, 634 for processing and synchronization of all client interactions.

The foregoing description of the invention is illustrative, and modifications in configuration and implementation will occur to persons skilled in the art. For instance, steps can be combined or may be performed in any order. Hardware, software or other resources described as singular may in embodiments be distributed, and similarly in embodiments resources described as distributed may be combined. The scope of the invention is accordingly intended to be limited only by the following claims.

I claim:

1. A method for the remote display of graphical data, the graphical data representing a three-dimensional model of an object, the method comprising the steps of:
    rendering the graphical data on a server to form a projection view image;
    processing the projection view image, using a server graphics accelerator, to produce a scaled-down image having a transmission size less than a transmission size of the projection view image;
    transmitting the scaled-down image from the server to a client;
    processing the scaled-down image on a client graphics accelerator to substantially reproduce the projection view image; and
    displaying the substantially reproduced projection view image on the client.

2. The method of claim 1, wherein processing the projection view image on the server graphics accelerator comprises:
    reformatting the projection view image into a native processing format of the server;
    binding the reformatted projection view image into a texture memory to form a texture map;
    applying the texture map to a polygon having a predetermined scaling factor to form the scaled-down image; and
    reformatting the scaled-down image into a native processing format of the client.

3. The method of claim 1, wherein the scaled-down image is transmitted from the server graphics accelerator to the client graphics accelerator through a network medium.

4. The method of claim 1, wherein the projection view image is substantially reproduced on the client graphics accelerator by scaling the scaled-down image to increase the transmission size of the scaled-down image.

5. The method of claim 1, wherein the substantially reproduced projection view image is displayed on the client to a user using adaptive resolution.

6. The method of claim 5, wherein the adaptive resolution comprises adaptively setting end resolution from lossy to lossless factors.

7. The method of claim 6, wherein the substantially reproduced projection view image is displayed using lossy factors while the graphical data is being manipulated.

8. The method of claim 6, wherein the substantially reproduced projection view image is displayed using lossless factors while the graphical data is stationary.

9. The method of claim 8, wherein the substantially reproduced projection view image is displayed in a one-to-one pixel resolution.

10. The method of claim 1, wherein the server and the client reside on a single computer.

11. The method of claim 1, wherein the server functions as a collaboration hub for the client.

12. The method of claim 1, wherein the server and the client operate in a remote execution networking environment.

13. The method of claim 1, wherein the client functions as a client/collaboration hub.

14. The method of claim 13, wherein the server is connected to the client by the client/collaboration hub.

15. The method of claim 1, wherein the client functions as a client/ASP server.

16. The method of claim 15, wherein the server is connected to the client by the client/ASP server.

17. The method of claim 15, wherein the server is connected to the client by the client/ASP server and a client/collaboration hub.

18. The method of claim 1, further comprising the step of compressing the scaled-down image on the server to further reduce the transmission size of the scaled-down image.

19. The method of claim 2 further comprising the step of retrieving information from the client graphics accelerator to reformat the scaled-down image into the native processing format of the client.

20. The method of claim 1, further comprising the steps of:
    manipulating the graphical data to create a new projection view image;
    processing the new projection view image on the server graphics accelerator to produce a new scaled-down image having a transmission size less than a transmission size of the new projection view image;
    transmitting the new scaled-down image from the server to the client;
    processing the new scaled-down image on the client graphics accelerator to substantially reproduce the new projection view image; and
    displaying the substantially reproduced new projection view image on the client.

21. The method of claim 20, further comprising the step of transmitting protocols to the client for enabling a user to manipulate the graphical data as the substantially reproduced new projection view image is displayed.

22. The method of claim 21, wherein the protocols comprise window protocol calls.

23. The method of claim 21, wherein the protocols comprise user interface information.

24. A method for transmitting graphical data to one or more clients, the graphical data representing a three-dimensional model of an object, the method comprising the steps of:
    rendering the graphical data on a server to form a projection view image;

processing the projection view image, using a server graphics accelerator, to produce a scaled-down image having a transmission size less than a transmission size of the projection view image; and transmitting the scaled-down image to at least one client.

25. The method of claim 24, wherein processing the projection view image on the server graphics accelerator comprises:

reformatting the projection view image into a native processing format of the server;

binding the reformatted projection view image into a texture memory to form a texture map;

applying the texture map to a polygon having a predetermined scaling factor to form the scaled-down image; and reformatting the scaled-down image into a native processing format of the client.

26. The method of claim 24, further comprising the steps of:

manipulating the graphical data to create a new projection view image;

processing the new projection view image on the server graphics accelerator to produce a new scaled-down image having a transmission size less than the transmission size of the new projection view image; and transmitting the new scaled-down image from the server to the client.

27. The method of claim 24, further comprising the step of transmitting protocols to the client for enabling a user to manipulate the graphical data.

28. The method of claim 27, wherein the protocols comprise window protocol calls.

29. The method of claim 27, wherein the protocols comprise user interface information.

30. A method for displaying graphical data on a client, the graphical data representing a three-dimensional model of an object, the method comprising the steps of:

receiving a scaled-down image from a server, the scaled-down image representing a smaller perspective of a projection view image rendered from the graphical data on the server;

processing the scaled-down image, using a client graphics accelerator, to substantially reproduce the projection view image; and displaying the substantially reproduced projection view image on the client.

31. The method of claim 30, wherein the scaled-down image has a transmission size less than a transmission size of the projection view image.

32. The method of claim 31, wherein the projection view image is substantially reproduced on the client graphics accelerator by scaling the scaled-down image to increase the transmission size of the scaled-down image.

33. The method of claim 30, wherein the projection view image is displayed on the client to a user using adaptive resolution.

34. The method of claim 30, further comprising the step of receiving protocols from the server for enabling a user to manipulate the graphical data.

35. The method of claim 34, wherein the protocols comprise window protocol calls.

36. The method of claim 34, wherein the protocols comprise user interface information.

37. A system for the remote display of graphical data, the graphical data representing a three-dimensional model of an object, the system comprising:

a server;

a server application rendering module configured to render the graphical data in the form of a projection view image;

a server graphics accelerator configured to produce a scaled-down image from the projection view image, the scaled-down image having a transmission size less than a transmission size of the projection view image;

a network for transmitting the scaled-down image to a client;

a client graphics accelerator configured to substantially reproduce the projection view image; and a monitor for displaying the substantially reproduced projection view image on the client.

38. The system of claim 37, wherein the graphical data may be manipulated to form a new projection view image, the server graphics accelerator being further configured to process the new projection view image to produce a new scaled-down image having a transmission size less than the transmission size of the new projection view image, the new scaled-down image being transmitted over the network from the server to the client, the client graphics accelerator being further configured to process the new scaled-down image to substantially reproduce the new production view image, the monitor displaying the substantially reproduced new production view image.

39. The system of claim 38, wherein protocols are transmitted over the network from the server to the client for enabling a user to manipulate the graphical data as the substantially reproduced new production view image is displayed on the monitor.

40. The system of claim 39, wherein the protocols comprise window protocol calls.

41. The system of claim 39, wherein the protocols comprise user interface protocol calls.

42. The system of claim 37, wherein the local server and the client reside on the same computer.

43. The system of claim 37, wherein the server functions as a collaboration hub for the client.

44. The system of claim 37, wherein the server and the client operate in a remote execution networking environment.

45. The system of claim 37, wherein the client functions as a client/collaboration hub.

46. The system of claim 45, wherein the server is connected to the client by the client/collaboration hub.

47. The system of claim 37, wherein the client functions as a client/ASP server.

48. The system of claim 47, wherein the server is connected to the client by the client/ASP server.

49. The system of claim 47, wherein the server is connected to the client by the client/ASP server and a client/collaboration hub.

50. A system for transmitting graphical data to one or more clients, the graphical data representing a three-dimensional model of an object, the system comprising:

a server;

a server application rendering module configured to render the graphical data in the form of a projection view image;

a server graphics accelerator configured to produce a scaled-down image from the projection view image, the scaled-down image having a transmission size less than a transmission size of the projection view image; and a network for transmitting the scaled-down image to a client.

51. The system of claim 50, wherein the server graphics accelerator is further configured to:
- reformat the projection view image into a native processing format of the server;
- bind the reformatted projection view image into a texture memory to form the texture map;
- apply the texture map to a polygon having a predetermined scaling factor to form the scaled-down image; and
- reformat the scaled-down image into a native processing format of the client.

52. The system of claim 50, wherein the graphical data may be manipulated to form a new projection view image, the server graphics accelerator being further configured to process the new projection view image to produce a new scaled-down image having a transmission size less than the transmission size of the new projection view image, the new scaled-down image being transmitted over the network from the server to the client.

53. The system of claim 50, wherein protocols are transmitted over the network from the server to the client for enabling a user to manipulate the graphical data.

54. The system of claim 53, wherein the protocols comprise window protocol calls.

55. The system of claim 53, wherein the protocols comprise user interface information.

56. A system for displaying graphical data on a client, the graphical data representing a three-dimensional model of an object, the system comprising:
- a client for receiving a scaled-down image from a server, the scaled-down image representing a smaller perspective of a projection view image rendered from the graphical data on the server;
- a client graphics accelerator for processing the scaled-down image to substantially reproduce the projection view image; and
- a monitor for displaying the substantially reproduced projection view image on the client.

57. The system of claim 56, wherein the scaled-down image has a transmission size less than the transmission size of the projection view image.

58. The system of claim 57, wherein the projection view image is substantially reproduced on the client graphics accelerator by scaling the scaled-down image to increase the transmission size of the scaled-down image.

59. The system of claim 56, wherein the projection view image is displayed on the client to a user using adaptive resolution.

60. A method for the remote manipulation and display of graphical data, the graphical data representing a three-dimensional model of an object, the method comprising the steps of:
- rendering the graphical data on a server to form a projection view image;
- processing the projection view image, using a server graphics accelerator, to produce a scaled-down image having a transmission size less than the transmission size of the projection view image;
- transmitting the scaled-down image from the server to a client;
- processing the scaled-down image to substantially reproduce the scaled-down image;
- displaying the substantially reproduced projection view image on the client;
- manipulating the graphical data to create a new projection view image;
- processing the new projection view image to produce a new scaled-down image having a transmission size less than a transmission size of the new projection view image;
- transmitting the new scaled-down image from the server to the client;
- processing the new scaled-down image to substantially reproduce the new projection view image; and
- displaying the substantially reproduced new projection view image on the client substantially contemporaneous with the manipulation of the graphical data.

* * * * *